(12) United States Patent
Fujita et al.

(10) Patent No.: US 12,384,078 B2
(45) Date of Patent: Aug. 12, 2025

(54) CASING MEMBER FOR IN-VEHICLE CAMERA AND METHOD OF MANUFACTURING THE SAME

(71) Applicant: Polyplastics Co., Ltd., Tokyo (JP)

(72) Inventors: Takashi Fujita, Shizuoka (JP); Hiroki Arai, Shizuoka (JP)

(73) Assignee: POLYPLASTICS CO., LTD., Tokyo (JP)

( * ) Notice: Subject to any disclaimer, the term of this patent is extended or adjusted under 35 U.S.C. 154(b) by 812 days.

(21) Appl. No.: 17/763,419

(22) PCT Filed: Sep. 16, 2020

(86) PCT No.: PCT/JP2020/035012
§ 371 (c)(1),
(2) Date: Mar. 24, 2022

(87) PCT Pub. No.: WO2021/060096
PCT Pub. Date: Apr. 1, 2021

(65) Prior Publication Data
US 2022/0388208 A1    Dec. 8, 2022

(30) Foreign Application Priority Data
Sep. 27, 2019   (JP) .................................. 2019-177248

(51) Int. Cl.
*B29C 45/00* (2006.01)
*B60R 11/04* (2006.01)
(Continued)

(52) U.S. Cl.
CPC .......... *B29C 45/0013* (2013.01); *B60R 11/04* (2013.01); *C08K 3/26* (2013.01);
(Continued)

(58) Field of Classification Search
CPC ... C08K 7/14; C08K 3/26; C08K 7/20; C08K 7/28; C08K 3/346; C08L 81/04; C08L 81/02; C08L 51/003
See application file for complete search history.

(56) References Cited

U.S. PATENT DOCUMENTS

| 5,945,490 A | 8/1999 | Tsuda |
| 2013/0321696 A1 | 12/2013 | Bae |

FOREIGN PATENT DOCUMENTS

| JP | 2007-204615 | 8/2007 |
| JP | 2007-204616 | 8/2007 |

(Continued)

OTHER PUBLICATIONS

International Search Report issued in International Patent Application No. PCT/JP2020/035012, dated Nov. 17, 2020, along with an English translation thereof.

(Continued)

*Primary Examiner* — James C Yager
(74) *Attorney, Agent, or Firm* — GREENBLUM & BERNSTEIN, P.L.C.

(57) ABSTRACT

A casing member for an in-vehicle camera, obtained by injection molding a resin composition that comprises 100 to 300 parts by mass of a total of a fibrous inorganic filler and a non-fibrous inorganic filler to 100 parts by mass of a polyarylene sulfide resin and has a content of an elastomer of 10% by mass or less, and satisfying the following conditions (A) and (B). (A) When a molded product of a predetermined shape is injection molded using the resin composition under predetermined conditions, an absolute value of (shrinkage rate in a direction perpendicular to a flow direction)–(shrinkage rate in the flow direction) is 0.5% or less. (B) A water absorption rate of a molded product of a predetermined shape that is injection molded using the resin (Continued)

composition under predetermined conditions is 0.3% or less when subjected to a predetermined hot water immersion test.

9 Claims, 2 Drawing Sheets

(51) Int. Cl.
| | | |
|---|---|---|
| C08K 3/26 | (2006.01) | |
| C08K 3/40 | (2006.01) | |
| C08K 7/14 | (2006.01) | |
| G03B 30/00 | (2021.01) | |
| B29K 81/00 | (2006.01) | |
| B29K 105/16 | (2006.01) | |
| B29K 509/00 | (2006.01) | |
| B29L 31/30 | (2006.01) | |
| B60R 11/00 | (2006.01) | |

(52) U.S. Cl.
CPC ............. *C08K 3/40* (2013.01); *C08K 7/14* (2013.01); *G03B 30/00* (2021.01); *B29K 2081/04* (2013.01); *B29K 2105/16* (2013.01); *B29K 2509/00* (2013.01); *B29L 2031/30* (2013.01); *B60R 2011/0003* (2013.01); *B60R 2011/004* (2013.01); *C08K 2003/265* (2013.01)

(56) References Cited

FOREIGN PATENT DOCUMENTS

| | | |
|---|---|---|
| JP | 2009-173865 | 8/2009 |
| JP | 2016-194046 | 11/2016 |
| WO | 2016-103470 | 6/2016 |

OTHER PUBLICATIONS

Written Opinion of the International Searching Authority issued in International Patent Application No. PCT/JP2020/035012, dated Nov. 17, 2020.

Notification of Reason(s) for Refusal issued on Sep. 7, 2021, in JP2019-177248, filed on Sep. 27, 2019, along with a partial English translation thereof.

Office Action issued in DE Pat. App. No. 11 2020 004 604.4, issued Oct. 25, 2023, delivered Oct. 30, 2023, with partial translation.

CASING MEMBER FOR IN-VEHICLE CAMERA AND METHOD OF MANUFACTURING THE SAME

TECHNICAL FIELD

The present invention relates to a casing member for an in-vehicle camera that is usable as a housing or a lens barrel of the in-vehicle camera.

BACKGROUND ART

In-vehicle cameras have been rapidly spreading in recent years, which are mounted on, for example, windshields or rear glasses, or in the vicinity thereof, in vehicles, such as automobiles and trucks, and which record images of the front or rear of vehicles through the windshields or rear glasses. Unlike ordinary cameras, in-vehicle cameras are permanently installed in vehicles, or they are subject to vibrations during driving and to high temperatures and humidity, especially in summer. Thus, measures are to be taken to maintain various performances.

Resin is often used as a material for a casing member, such as a housing and a lens barrel, which is a member of an in-vehicle camera. The occurrence of warp is to be small in the housing. Further, the lens barrel is to have a high roundness to hold the lens inside to maintain optical performance. As described above, the inside of the vehicle tends to be a high temperature and high humidity environment, especially in summer. Under such an environment, the housing tends to warp, and the lens barrel tends to lose its roundness. In particular, even a slight decrease in the roundness of the lens barrel may cause misalignment of the optical axis and hinder the optical performance. That is, both the housing and the lens barrel are to have dimensional accuracy to maintain the initial dimensions with little warp and deformation even in a high temperature and high humidity environment. In particular, the lens barrel is to have extremely precise dimensional accuracy because even a small misalignment of the lens hinders the optical performance as described above.

Polyarylene sulfide resins (hereinafter referred to as "PAS resins"), represented by polyphenylene sulfide resins (hereinafter referred to as "PPS resins"), have high heat resistance, mechanical properties, chemical resistance, dimensional stability, and flame retardancy and are widely used in electrical and electronic equipment component materials, automotive equipment component materials, chemical equipment component materials, and the like. Thus, PAS resins are useful as a material for a casing member of an in-vehicle camera. PAS resin molded products have been proposed for the purpose of increasing the roundness and preventing the occurrence of warp (increasing the flatness) (see Patent Literatures 1 to 3).

In contrast, the lens barrel may be mounted by press fitting a lens into the lens barrel in the manufacturing process. In this case, it is preferable to use a material having high toughness for the lens barrel to prevent cracking and the like due to press fitting. However, in the case of using a composition with an inorganic filler added to the PAS resin, the toughness may be insufficient by itself, and thus, it is considered to add an elastomer to the composition to improve the toughness.

CITATION LIST

Patent Literature

Patent Literature 1: Japanese Unexamined Patent Application Publication No. 2007-204615

Patent Literature 2: Japanese Unexamined Patent Application Publication No. 2007-204616

Patent Literature 3: Japanese Unexamined Patent Application Publication No. 2009-173865

SUMMARY OF INVENTION

Technical Problem

The inventions described in Patent Literatures 1 to 3 do not take into consideration a casing member of an in-vehicle camera. That is, they do not take into consideration a use in an environment with large changes in temperature and humidity and exposed to high temperature and humidity (hereinafter referred to as "a high temperature and high humidity environment"), such as in a vehicle interior, in particular in a vehicle cabin (windshield side or rear glass side) and in a front grill close to an engine room, where an in-vehicle camera is installed. Therefore, it is not always possible to reduce the occurrence of warp and maintain a high roundness even under such an environment. In addition, when a lens is press fit and mounted during manufacturing, the lens barrel is to enhance toughness not to break during press fitting and to maintain dimensional accuracy both during press fitting and during use. If an elastomer is used to enhance toughness, water absorbency may increase, or gas may be generated, when the elastomer is used in a high temperature and high humidity environment. As water absorbency increases, dimensional accuracy deteriorates, and the gas generation causes fogging of the lens.

The present invention has been made in consideration of such issues as described above. An object of the present invention is to provide a casing member for an in-vehicle camera that is excellent in dimensional accuracy and its holding performance even in a high temperature and high humidity environment, and in which gas generation is prevented.

Technical Solution

In response to the above issues, one or more aspects of the present invention are directed to:

(1) A casing member for an in-vehicle camera, obtained by injection molding a resin composition that comprises 100 to 300 parts by mass of a total of a fibrous inorganic filler and a non-fibrous inorganic filler to 100 parts by mass of a polyarylene sulfide resin and has a content of an elastomer of 10% by mass or less, and satisfying the following conditions (A) and (B).

(A) When a molded product of 80 mm×80 mm×1 mm is injection molded using the resin composition under conditions of a cylinder temperature of 320° C., a mold temperature of 140° C., and a holding pressure of 70 MPa, an absolute value of (shrinkage rate in a direction perpendicular to a flow direction)−(shrinkage rate in the flow direction) is 0.5% or less.

(B) A water absorption rate of a molded product of 80 mm×80 mm×2 mm that is injection molded using the resin composition under conditions of a cylinder temperature of 320° C., a mold temperature of 140° C., and a holding pressure of 70 MPa is 0.3% or less when subjected to a hot water immersion test at 80° C. for 300 hours.

(2) The casing member for the in-vehicle camera according to (1), wherein the polyarylene sulfide resin has a melt viscosity of 70 Pa·s or less measured at a temperature of 310° C. and a shear rate of 1200 sec$^{-1}$.

(3) The casing member for the in-vehicle camera according to (1) or (2), wherein a mass ratio of the fibrous inorganic filler to the non-fibrous inorganic filler is 0.2 to 4.5.

(4) The casing member for the in-vehicle camera according to any one of (1) to (3), wherein an average value of a linear expansion coefficient in a flow direction and a linear expansion coefficient in a direction perpendicular to the flow direction at 150° C. is 35 ($\times 10^{-6} K^{-1}$) or less.

(5) The casing member for the in-vehicle camera according to any one of (1) to (4), wherein a creep deformation amount when a stress of 67 MPa is applied for 500 hours at a temperature of 120° C. is 3 mm or less.

(6) The casing member for an in-vehicle camera according to any one of (1) to (5), wherein the casing member is used in an in-vehicle camera to be mounted in a front grill of a vehicle or at a position facing a windshield.

(7) The casing member for the in-vehicle camera according to any one of (1) to (6), wherein the casing member is a lens barrel to store and hold a lens in the in-vehicle camera in a press fit state.

(8) The casing member for the in-vehicle camera according to any one of (1) to (6), wherein the casing member is a housing forming an exterior of the in-vehicle camera.

Advantageous Effects

The present invention enables to provide a casing member for an in-vehicle camera that is excellent in dimensional accuracy and its holding performance even in a high temperature and high humidity environment, and in which the gas generation is prevented.

DESCRIPTION OF EMBODIMENTS

Figure 1:
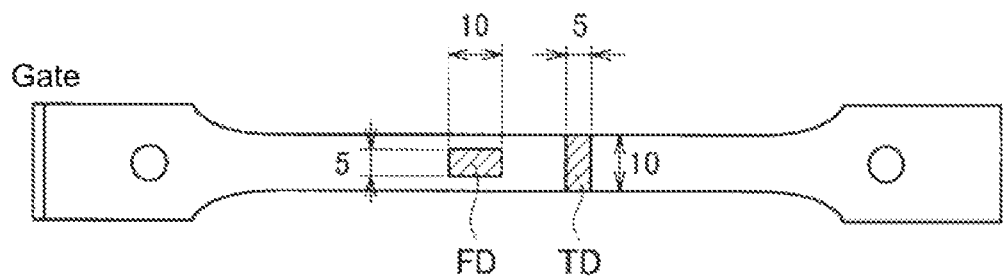
FIG. 1 is a top view of a test piece injection molded for measuring a linear expansion coefficient in examples and comparative examples.

A casing member for an in-vehicle camera according to the present embodiment is made by molding a resin composition that contains 100 to 300 parts by mass of a total of a fibrous inorganic filler and a non-fibrous inorganic filler to 100 parts by mass of a PAS resin and has a content of an elastomer of 10% by mass or less. Then, the following conditions (A) and (B) are satisfied:

(A) when a molded product of 80 mm×80 mm×1 mm is injection molded using the resin composition under conditions of a cylinder temperature of 320° C., a mold temperature of 140° C., and a holding pressure of 70 MPa, an absolute value of (shrinkage rate in a direction perpendicular to a flow direction)-(shrinkage rate in the flow direction) is 0.5% or less; and (B) a water absorption rate of a molded product of 80 mm×80 mm×2 mm that is injection molded using the resin composition under conditions of a cylinder temperature of 320° C., a mold temperature of 140° C., and a holding pressure of 70 MPa is 0.3% or less when subjected to a hot water immersion test at 80° C. for 300 hours.

Since the casing member for the in-vehicle camera according to the present embodiment contains a predetermined amount of the fibrous inorganic filler and the non-fibrous inorganic filler, the casing member not only has a high mechanical strength but also has a low water absorption rate to the extent that the condition (B) is satisfied. Thus, dimensional accuracy is excellent to the extent that the condition (A) is satisfied under a high temperature and high humidity environment.

The casing member for the in-vehicle camera according to the present embodiment is suitably applied to a housing forming the exterior of the in-vehicle camera or a lens barrel storing and holding a lens within the in-vehicle camera in a press fit state. In both cases of being applied to the housing and to the lens barrel, high dimensional accuracy is kept at high temperature and high humidity, and in particular, it is possible to keep dimensional accuracy well in a vehicle having high temperature and high humidity in summer. The casing member for the in-vehicle camera according to the present embodiment is particularly useful for the lens barrel because even a slight deviation in the dimensions particularly in the lens barrel hinders its optical performance.

In the present embodiment, since an elastomer, which may cause the generation of gas, is not contained, or even if contained, it is very small, the water absorbency does not increase, and it is possible to prevent lens fogging caused by elastomer-derived gas.

Note that the in-vehicle camera is generally mounted in a front grill of a vehicle, or on a windshield side or a rear glass side of a vehicle interior, and the temperature tends to be particularly high in the front grill and on the windshield side. Thus, in the present embodiment, it is particularly effective to apply to the in-vehicle camera mounted in the front grill of the vehicle or at a position opposed to the windshield.

Each component of the resin composition according to the present embodiment is described below.

[Polyarylene Sulfide Resin]

A PAS resin has excellent mechanical properties, electrical properties, heat resistance and other physical and chemical properties, dimensional stability, and good processability. The PAS resin is a polymer compound mainly made from —(Ar—S)— (where Ar is an arylene group) as a repeating unit, and a PAS resin having a generally-known molecular structure is usable in the present embodiment.

Examples of the above-described arylene group include a p-phenylene group, an m-phenylene group, an o-phenylene group, a substituted phenylene group, a p,p'-diphenylene sulfone group, a p,p'-biphenylene group, a p,p'-diphenylene ether group, a p,p'-diphenylene carbonyl group, and a naphthalene group. The PAS resin may be a homopolymer made from only the above-described repeating unit. In some cases, a copolymer containing the following different repeating units may be preferable from the viewpoint of processability.

As the homopolymer, a polyphenylene sulfide resin with a p-phenylene sulfide group, which uses a p-phenylene group as the arylene group, as a repeating unit is preferably used. As the copolymer, a combination of two or more different kinds of arylene sulfide groups made from the above-described arylene group is usable, and a combination containing a p-phenylene sulfide group and an m-phenylene sulfide group is particularly preferably used. Among these, those containing 70 mol % or more, preferably 80 mol % or more, of the p-phenylene sulfide group are suitable from the viewpoint of physical properties, such as heat resistance, moldability, and mechanical properties. Among these PAS resins, a high molecular weight polymer having a substantially straight-chain structure obtained by condensation polymerization from a monomer mainly made from a bifunctional halogen aromatic compound is particularly preferably usable. Note that the PAS resin used in the present embodiment may be a mixture of two or more PAS resins having different molecular weights.

Note that in addition to the PAS resin having a straight-chain structure, an example is a polymer in which a branched structure or a cross-linked structure is partially formed by using a small amount of a monomer, such as a polyhalo aromatic compound having three or more halogen substituents, during condensation polymerization. Another example is a polymer in which a straight-chain structural polymer with a low molecular weight is heated at a high temperature in the presence of oxygen or the like to increase melt viscosity by oxidative cross-linking or thermal cross-linking to improve moldability.

In the present embodiment, the viscosity of the resin composition tends to increase due to the high content of the fibrous inorganic filler and the non-fibrous inorganic filler, and it is preferable to use a PAS resin having a low molecular weight. When the molecular weight is low, the degree of crystallization is higher, which results in lower water absorbency. Consequently, it contributes to maintaining dimensional accuracy under a high humidity environment. In contrast, when the molecular weight of the PAS resin is too low, the toughness tends to decrease, which may be disadvantageous especially when the resin composition is used for the lens barrel in terms of cracking when a lens is press fit to be mounted and of creep deformation during use. Therefore, the melt viscosity measured at a temperature of 310° C. and a shear rate of 1200 sec$^{-1}$ of the PAS resin as a base resin used in the present embodiment is preferably in the range of 5 to 60 Pa·s, more preferably in the range of 8 to 50 Pa·s, including the case of the above-described mixed system.

[Fibrous Inorganic Filler and Non-Fibrous Inorganic Filler]

In the present embodiment, the resin composition contains a fibrous inorganic filler and a non-fibrous inorganic filler. The fibrous inorganic filler has a function of reducing a molding shrinkage rate and a linear expansion coefficient and improving mechanical properties. The non-fibrous inorganic filler has a function of reducing the molding shrinkage rate and anisotropy of the shrinkage rate. The water absorbency is reduced by containing both of the fibrous inorganic filler and the non-fibrous inorganic filler in a relatively large amount.

In the present embodiment, the resin composition contains 80 to 300 parts by mass of a total of the fibrous inorganic filler and the non-fibrous inorganic filler to 100 parts by mass of the PAS resin. When the above-described content is less than 80 parts by mass, the water absorbency may increase, or the dimensional accuracy may decrease. When the content exceeds 300 parts by mass, flowability reduces, which may cause difficulty in forming, or toughness reduces, which may cause, particularly in the case of the lens barrel, cracking or the like in press fitting of the lens during manufacturing. The content is preferably 88 to 250 parts by mass, more preferably 90 to 230 parts by mass, even more preferably 100 to 210 parts by mass.

Each of the fibrous inorganic filler and the non-fibrous inorganic filler is described below.

(Fibrous Inorganic Filler)

In the fibrous inorganic filler, "fibrous" means a shape having a different diameter ratio of 1 to 4 and an average fiber length (cut length) of 0.01 to 3 mm in the initial shape (shape before melt kneading). The different diameter ratio is "a major diameter of a section perpendicular to a longitudinal direction (the longest linear distance of the section)/a minor diameter of the section (the longest linear distance perpendicular to the major diameter)" and can be calculated using a scanning electron microscope and image processing software. For the average fiber length (cut length), a manufacturer's value (a value published by a manufacturer in a catalog, or the like) may be used.

Examples of the fibrous inorganic filler specifically include a mineral fiber, such as a glass fiber, a carbon fiber, a zinc oxide fiber, a titanium oxide fiber, a wollastonite, a silica fiber, a silica-alumina fiber, a zirconia fiber, a boron nitride fiber, a silicon nitride fiber, a boron fiber, and a potassium titanic acid fiber, and a metal fibrous material, such as a stainless steel fiber, an aluminum fiber, a titanium fiber, a copper fiber, and a brass fiber, and one or more kinds of these may be used. Among these, a glass fiber and a carbon fiber are preferable.

Examples of the glass fiber put on the market include a chopped glass fiber (ECS03T-790DE, average fiber diameter: 6 μm) manufactured by Nippon Electric Glass Co., Ltd., a chopped glass fiber (CS03DE 416A, average fiber diameter: 6 μm) manufactured by OWENS CORNING JAPAN LLC, a chopped glass fiber (ECS03T-747H, average fiber diameter: 10.5 μm) manufactured by Nippon Electric Glass Co., Ltd., a chopped glass fiber (ECS03T-747, average fiber diameter: 13 μm) manufactured by Nippon Electric Glass Co., Ltd., a chopped strand with irregular cross sections CSG 3PA-830 (major diameter 28 μm, minor diameter 7 μm) manufactured by Nitto Boseki Co., Ltd., and a chopped strand with irregular cross sections CSG 3PL-962 (major diameter 20 μm, minor diameter 10 μm) manufactured by Nitto Boseki Co., Ltd.

The fibrous inorganic filler may be surface-treated with various surface treatment agents, such as an epoxy-based compound, an isocyanate-based compound, a silane-based compound, a titanate-based compound, and a fatty acid, which are generally known. The surface treatment enables to improve the adhesiveness with the PAS resin. The surface treatment agent may be applied to the fibrous inorganic filler prior to material preparation and subjected to surface treatment or convergence treatment, or may be added simultaneously in material preparation.

The fiber diameter of the fibrous inorganic filler is not limited but may be, for example, 5 μm or more and 30 μm or less in the initial shape (shape before melt kneading). Here, the fiber diameter of the fibrous inorganic filler means the major diameter of the fiber section of the fibrous inorganic filler.

(Non-Fibrous Inorganic Filler)

Examples of the non-fibrous inorganic filler include a granular powder inorganic filler and a plate-like inorganic filler. In the granular powder inorganic filler, "granular powder" means a shape (including a spherical shape) having a different diameter ratio of 1 to 4 and an aspect ratio of 1 to 2. In the plate-like inorganic filler, "plate-like" means a shape having a different diameter ratio greater than 4 and an aspect ratio of 1 to 500.

Both shapes are initial shapes (shapes before melt kneading). Note that the aspect ratio is "a longest linear distance in a longitudinal direction/a minor diameter of a section perpendicular to the longitudinal direction (the longest linear distance perpendicular to a line of the longest distance in the section)".

Examples of the granular powder inorganic filler include carbon black, silica, quartz powder, glass beads, glass powder, talc (granular), a silicate such as a calcium silicate, an aluminum silicate, and diatomaceous earth, a metal oxide, such as an iron oxide, a titanium oxide, a zinc oxide, and alumina (granular), a metal carbonate, such as a calcium carbonate and a magnesium carbonate, a metal sulfate, such as a calcium sulfate and a barium sulfate, a silicon carbide, a silicon nitride, a boron nitride, and various metal powders, and one or more kinds of these are usable. Among these, a calcium carbonate, talc, and glass beads are preferable.

Examples of the calcium carbonate put on the market include Whiton P-30 (average particle size (50% d): 5 μm) manufactured by Toyo Fine Chemical Co., Ltd. Examples of the talc put on the market include LMS100, LMR100, PKP80, and PKP53S manufactured by FUJI TALC INDUSTRIAL CO., LTD. Examples of the glass beads put on the market include EGB731A (average particle size (50% d): 20 μm) manufactured by Potters-Ballotini Co., Ltd., and EMB-10 (average particle size (50% d): 5 μm) manufactured by Potters-Ballotini Co., Ltd.

The granular powder inorganic filler may also be surface-treated in the same manner as the fibrous inorganic filler.

Examples of the plate-like inorganic filler include glass flakes, talc (plate shape), mica, kaolin, clay, alumina (plate shape), and various kinds of metal foils, and one or more kinds of these are usable. Among these, glass flakes and talc are preferable.

Examples of the glass flakes put on the market include REFG-108 (average particle size (50% d): 623 μm) manufactured by Nippon Sheet Glass Co., Ltd., fine flakes (average particle size (50% d): 169 μm) manufactured by Nippon Sheet Glass Co., Ltd., REFG-301 (average particle size (50% d): 155 μm) manufactured by Nippon Sheet Glass Co., Ltd., and REFG-401 (average particle size (50% d):310 μm) manufactured by Nippon Sheet Glass Co., Ltd.

Examples of the talc put on the market include Crown Talc PP manufactured by Matsumura Sangyo Co., Ltd., and Talcan Powder PKNN manufactured by HAYSHI KASEI CO., LTD.

The plate-like inorganic filler may also be surface-treated in the same manner as the fibrous inorganic filler.

In the present embodiment, the mass ratio of the fibrous inorganic filler to the non-fibrous inorganic filler is preferably 0.2 to 4.5, more preferably 0.25 to 2.5, even more preferably 0.5 to 2.3, particularly preferably 0.5 to 2.2, in terms of dimensional accuracy and mechanical strength. To improve dimensional accuracy, it is preferable to use less fibrous inorganic filler than the non-fibrous inorganic filler. Thus, the above-described mass ratio is preferably 0.2 to 2.5, more preferably 0.2 to 2.3, in the case of a lens barrel, and is preferably 0.5 to 3.5 in the case of a housing. In particular, in the lens barrel, increasing the ratio of the non-fibrous inorganic filler as described above enables to prevent the rigidity from becoming excessively high, which is preferable from the point of being easy to prevent cracking when the lens is press fit.

[Elastomer]

In the present embodiment, the content of the elastomer in the resin composition is 10% by mass or less. Since the presence of the elastomer increases water absorbency or generates gas, the elastomer should not be present at all, or if present, should be in an extremely small amount. Especially, in the case of the lens barrel, the existence of the elastomer is to be specifically considered because the gas may cause fogging of the lens. Therefore, in the present embodiment, the content of the elastomer in the resin composition is 10% by mass or less. When the above-described content exceeds 10% by mass, gas generation causes fogging of the lens. The content of the elastomer is preferably 7.5% by mass or less, more preferably 6.5% by mass or less, even more preferably 5% by mass or less, particularly preferably 3% by mass or less, most preferably 2.5% by mass or less, ideally 0% by mass. Note that in the resin composition used for the lens barrel, it is desirable to add the elastomer to impart toughness from the viewpoint of preventing cracking due to press fitting of the lens, but there is a tradeoff that fogging of the lens tends to occur due to gas generation when the elastomer is increased. Then, to use a resin composition that does not contain the elastomer in consideration of preventing gas generation, the ratio between the fibrous inorganic filler and the non-fibrous inorganic filler may be adjusted, or the viscosity of the PAS resin may be adjusted, as described above, to prevent cracking due to press fitting.

The elastomer is not limited. Examples of the elastomer include one that contains a structural unit derived from an α-olefin and a structural unit derived from an α,β-unsaturated acid glycidyl ester as copolymerization components and may contain a structural unit derived from a (meth) acrylic acid ester. The elastomer may be used alone or in combination of two or more kinds.

Specific examples of the elastomer include a glycidyl methacrylate graft modified ethylene copolymer, an ethylene-glycidyl methacrylate copolymer, an ethylene-glycidyl methacrylate-methyl acrylate copolymer, an ethylene-glycidyl methacrylate-ethyl acrylate copolymer, an ethylene-glycidyl methacrylate-propyl acrylate copolymer, and an ethylene-glycidyl methacrylate-butyl acrylate copolymer. Among them, the ethylene-glycidyl methacrylate copolymer and the ethylene-glycidyl methacrylate-methyl acrylate copolymer are preferable. Specific examples of the ethylene-glycidyl methacrylate copolymer and the ethylene-glycidyl methacrylate-methyl acrylate copolymer include "Bond First" (manufactured by SUMITOMO CHEMICAL COMPANY, LIMITED).

[Alkoxysilane Compound]

In the present embodiment, an alkoxysilane compound may be contained for preventing burr generation. The alkoxysilane compound is not limited, and examples thereof include an alkoxysilane, such as an epoxyalkoxysilane, an aminoalkoxysilane, a vinylalkoxysilane, and a mercaptoalkoxysilane, and one or more of these are used. Note that the number of carbon atoms of the alkoxy group is preferably 1 to 10, particularly preferably 1 to 4.

Examples of the epoxyalkoxysilane include a γ-glycidoxypropyltrimethoxysilane, a β-(3,4-epoxycyclohexyl) ethyltrimethoxysilane, and a γ-glycidoxypropyltriethoxysilane.

Examples of the aminoalkoxysilane include a γ-aminopropyltrimethoxysilane, a γ-aminopropyltriethoxysilane, a γ-aminopropylmethyldimethoxysilane, a γ-aminopropylmethyldiethoxysilane, an N-(β-aminoethyl)-γ-aminopropyltrimethoxysilane, an N-phenyl-γ-aminopropyltrimethoxysilane, a γ-diallylaminopropyltrimethoxysilane, and a γ-diallylaminopropyltriethoxysilane.

Examples of the vinylalkoxysilane include a vinyltrimethoxysilane, a vinyltriethoxysilane, and a vinyltris (β-methoxyethoxy) silane.

Examples of the mercaptoalkoxysilane include a γ-mercaptopropyltrimethoxysilane and a γ-mercaptopropyltriethoxysilane.

Among these, the epoxyalkoxysilane and the aminoalkoxysilane are preferable, and the γ-aminopropyltriethoxysilane is particularly preferable.

In the present embodiment, the addition of the alkoxysilane compound is not essential, but 0 to 5 parts by mass thereof to 100 parts by mass of the PAS resin may be added from the viewpoint of preventing burr generation.

[Other Components]

In the resin composition according to the present embodiment, in addition to the above components, a known additive generally added to a thermoplastic resin and a thermosetting resin, that is, a thermoplastic resin other than the PAS resin, a burr inhibitor other than the alkoxysilane compound, a mold release agent, a lubricant, a plasticizer, a flame retardant, a colorant, such as a dye and a pigment, a crystallization accelerator, a crystal nucleating agent, various antioxidants, a thermal stabilizer, a weather-resistant stabilizer, a corrosion inhibitor, and the like may be blended to impart desired properties according to the purpose to the extent that the effect of the resin composition is not impaired. However, when an amorphous thermoplastic resin is used as the thermoplastic resin other than the PAS resin, the absolute value of the shrinkage rate is advantageously reduced, but the water absorption rate tends to be high. Therefore, the addition of the amorphous thermoplastic resin is limited to a small amount, preferably 10% by mass or less, more preferably 5% by mass or less of the total resin composition, for example.

The casing member for the in-vehicle camera according to the present embodiment is molded according to a predetermined method by injection molding using the above-described resin composition.

As described above, the casing member for the in-vehicle camera according to the present embodiment satisfies the condition (A) that an absolute value of (shrinkage rate in a direction perpendicular to a flow direction)−(shrinkage rate in the flow direction) is 0.5% or less when the resin composition according to the present embodiment is used and injection molded under predetermined conditions. To satisfy the condition (A), the anisotropy of the shrinkage rate may be reduced by increasing the ratio of the non-fibrous inorganic filler having a small aspect ratio, or the absolute value of the shrinkage rate may be reduced by increasing the content of the fibrous filler and/or the non-fibrous inorganic filler.

Note that the absolute value of the shrinkage rate in a direction perpendicular to the flow direction is preferably 0.65 or less.

Similarly, the casing member for the in-vehicle camera according to the present embodiment satisfies the condition (B) that a water absorption rate of a molded product of a predetermined size that is injection molded under a predetermined condition using the resin composition according to the present embodiment is 0.3% or less when subjected to a hot water immersion test at 80° C. for 300 hours. To satisfy the condition (B), adjustments may be made by reducing the content of the elastomer or by reducing the addition of a filler that may increase the water absorption rate, such as a porous inorganic filler.

In the casing member for the in-vehicle camera according to the present embodiment, preferably, an average value of a linear expansion coefficient in a flow direction and a linear expansion coefficient in a direction perpendicular to the flow direction at 150° C. is 35 ($\times 10^{-6} K^{-1}$) or less. The average value of the linear expansion coefficients within the above-described range enables to reduce deformation due to temperature change. More preferably, the average value of the linear expansion coefficients is 2 to 30 ($\times 10^{-6} K^{-1}$). Note that the linear expansion coefficients are adjustable according to the content of the fibrous inorganic filler or the content of the non-fibrous inorganic filler.

Preferably, the casing member for the in-vehicle camera according to the present embodiment has a creep deformation amount of 3 mm or less when a stress of 67 MPa is applied for 500 hours at a temperature of 120° C. The creep deformation amount within the above-described range especially enables to reduce deformation before and after press fitting of the lens in the case of the lens barrel. Note that the creep deformation amount is adjustable according to the molecular weight of the PAS resin, the content of the fibrous inorganic filler, the content of the non-fibrous inorganic filler, the content of the elastomer, or the like.

When the casing member for the in-vehicle camera according to the present embodiment is applied to the lens barrel, a high degree of roundness is intended. The present embodiment provides the superior dimensional accuracy under a high temperature and high humidity environment as described above and thus provides a high degree of roundness at the same environment.

EXAMPLES

Although the present embodiment is described more specifically with reference to examples, the present embodiment is not limited to the following examples.

Examples 1 to 4 and Comparative Examples 1 to 4

In each of examples and comparative examples, raw material components in table 1 were each dry-blended, then fed into a twin screw extruder at a cylinder temperature of 320° C. (the fibrous inorganic filler and the non-fibrous inorganic filler were separately added from a side feed portion of the extruder), melt-kneaded, and pelletized. Note that in table 1, the numerical value of each component indicates parts by mass. Details of each of the raw material components used are described below.

(1) PAS Resin
    PPS1: polyphenylene sulfide resin (melt viscosity: 50 Pa·s (shear rate: 1200 sec$^{-1}$, 310° C.)) manufactured by POLYPLASTICS CO., LTD.
    PPS2: polyphenylene sulfide resin (melt viscosity: 30 Pa·s (shear rate: 1200 sec$^{-1}$, 310° C.)) manufactured by POLYPLASTICS CO., LTD.
    PPS3: polyphenylene sulfide resin (melt viscosity: 80 Pa·s (shear rate: 1200 sec$^{-1}$, 310° C.)) manufactured by POLYPLASTICS CO., LTD.

(Measurement of Melt Viscosity of PPS Resins)

The melt viscosity of the above-described PPS resins was measured as follows.

Using a capilograph manufactured by Toyo Seiki Seisakusho, Co., Ltd., melt viscosity was measured at a barrel temperature of 310° C. and a shear rate of 1200 sec$^{-1}$ using a flat die of 1 mmφ×20 mmL as a capillary in accordance with ISO11443.

(2) Fibrous Inorganic Filler
    Glass fiber: chopped strand ECS03T-717, diameter: 13 mm, average fiber length: 3 mm, manufactured by Nippon Electric Glass Co., Ltd.

(3) Non-Fibrous Inorganic Filler
    Calcium carbonate: Whiton P-30 manufactured by Toyo Fine Chemical Kaisha, Ltd.
    Glass beads: EGB731A manufactured by Potters-Ballotini Co., Ltd.
    Glass flakes: REFG-108 manufactured by Nippon Sheet Glass Co., Ltd.
    Talc: Crown Talc PP manufactured by Matsumura Sangyo Co., Ltd.

(4) Elastomer
    Olefin copolymer: Modiper (registered trademark) A4300 (a copolymer obtained by grafting 70 parts by mass of an ethylene-glycidyl methacrylate copolymer with 30 parts by mass of a methyl methacrylate-butyl acrylate copolymer) manufactured by NOF CORPORATION.

(5) Alkoxysilane Compound

Silane compound: γ-aminopropyltriethoxysilane KE-903P manufactured by Shin-Etsu Chemical Co., Ltd.

[Evaluation]

(1) Shrinkage Rate

Using a pellet prepared in each of the examples and comparative examples, a test piece of 80 mm×80 mm×1 mm was injection molded from a 2 mm×1 mm side gate provided at the center of one side under conditions of a cylinder temperature of 320° C., a mold temperature of 140° C., and a holding pressure of 70 MPa. A three-dimensional measuring device (three-dimensional size measuring device CRYSTA-Apec C574 manufactured by Mitsutoyo Co.) was used to measure the size at a position 20 mm from the end of the molded product in a perpendicular direction (flow direction) orthogonal to the gate side and the anti-gate side of the molded test piece. A value obtained by dividing a difference from a mold size at the position by the mold size was obtained as a shrinkage rate in a flow direction (X). Similarly, regarding a direction (perpendicular direction) orthogonal to the flow direction, the size at a position 20 mm from the end on the gate side was measured, and a value obtained by dividing a difference from a mold size at the position by the mold size was obtained as a shrinkage rate in a direction (Y) perpendicular to the flow direction. Note that the shrinkage rate in each direction was calculated as the average values of samples with n=5. As anisotropy of the shrinkage rate, the shrinkage rate in the direction (Y) perpendicular to the flow direction–the shrinkage rate in the flow direction (X) was calculated. The measurement and calculation results are shown in table 1.

(2) Water Absorption Rate

Using a pellet prepared in each of the examples and comparative examples, a test piece of 80 mm×80 mm×2 mm was injection molded under conditions of a cylinder temperature of 320° C., a mold temperature of 140° C., and a holding pressure of 70 MPa. The formed test piece was subjected to a hot water immersion test at 80° C. for 300 hours. The mass before and after the immersion was measured, and a value was obtained by dividing a difference obtained by subtracting the mass before the immersion from the mass after the immersion by the mass before immersion. The value exceeding 0.3% was evaluated as C, the value being 0.3% or less and exceeding 0.2% was evaluated as B, and the value being 0.2% or less was evaluated as A. The evaluation results are shown in table 1.

(3) Melt Viscosity of Resin Composition

Using a pellet prepared in each of the examples and comparative examples, melt viscosity was measured at a barrel temperature of 310° C. and a shear rate of 1000 sec$^{-1}$ using a flat die of 1 mmφ×20 mmL as a capillary in accordance with ISO 11443 using a capilograph manufactured by Toyo Seiki Seisaku-sho, Co., Ltd.

(4) Linear Expansion Coefficient

Using a pellet prepared in each of the examples and comparative examples, a test piece in FIG. 1 (Type 1A tensile test piece for ISO527-1, 2 in accordance with ISO3167) was injection molded under conditions of a cylinder temperature of 320° C., a mold temperature of 140° C., and a holding pressure of 70 MPa. Two hatched portions of the test piece were each cut out in a prismatic shape of 5 mm×4 mm×10 mm to obtain a test piece FD for evaluation whose longitudinal direction was the flow direction and a test piece TD for evaluation whose longitudinal direction was perpendicular to the flow direction. After annealing the test pieces FD and TD for evaluation at 250° C. for 1 hour, linear expansion coefficients were measured by a linear expansion measuring device TMA8310 manufactured by Rigaku Corporation, at a measurement temperature of –40 to 240° C., a temperature rise rate of 2° C./min, and a load of 4.0 kPa. Then, the linear expansion coefficient in each direction at 150° C. was obtained from the result, and the average value was calculated.

The average value being 30 ($\times 10^{-6} K^{-1}$) or less was evaluated as A, the average value exceeding 30 and being 35 or less was evaluated as B, and the average value exceeding 35 was evaluated as C. The evaluation results are shown in table 1.

Note that the unit of the numerical value indicating the length in FIG. 1 is "mm".

(5) Creep Deformation

The amount of deformation after 500 hours was measured by tester: bending NO. 145 creep tester manufactured by YASUDA SEIKI SEISAKUSHO, LTD., at an environmental temperature of 120° C. and a load stress of 67 MPa. The amount of 2.5 mm or less was evaluated as A, exceeding 2.5 mm and 3 mm or less was evaluated as B, and exceeding 3 mm was evaluated as C. The evaluation results are shown in table 1.

(6) Press Fitting Properties

Figure 2:
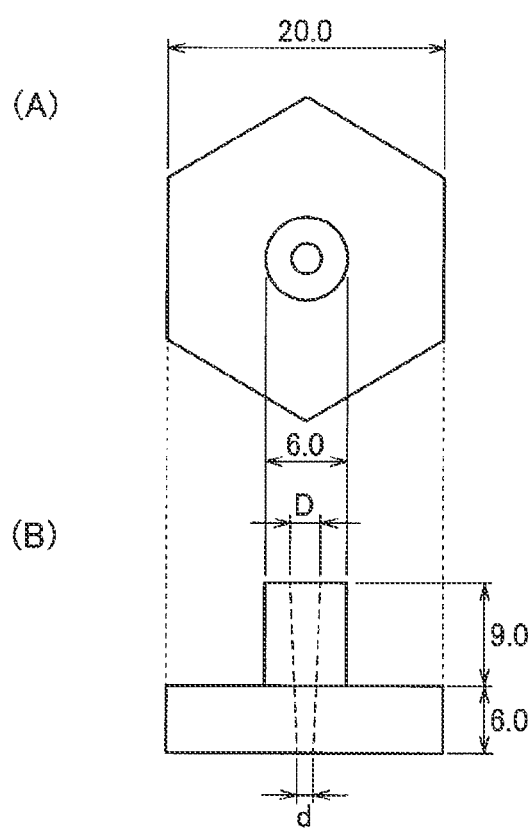
FIG. 2 illustrates respectively (A) a top view and (B) a side view of a molded product used in a press fitting test in examples and comparative examples.

Using a pellet prepared in each of examples and comparative examples, a molded product having a shape illustrated in FIG. 2 was injection molded under conditions of a cylinder temperature of 320° C., a mold temperature of 140° C., and a holding pressure of 70 MPa. The molded product in FIG. 2 has a shape in which a cylinder having a tapered through-hole standing in the center of the upper surface of a pedestal having a regular hexagonal column shape. The through hole also penetrates the pedestal and is formed to have a smaller diameter from the upper end toward the lower end. That is, the diameter of the through hole is D: 3.6 mm at the upper end and d: 3.472 mm at the lower end. Then, a pin (made from SUS304, elastic modulus: 190 Pa) having a diameter of 3.61 mm and a length of 20 mm was inserted through the hole at the upper end of the cylindrical portion at a speed of 1 mm/min, and the occurrence of cracking was visually observed. This was evaluated in each of the examples and comparative examples for molded products with n=3, and having no cracks was evaluated as A, having 1 to 2 cracks was evaluated as B, and having all 3 cracks was evaluated as C. The evaluation results are shown in table 1.

Note that the unit of the numerical value indicating the length in FIG. 2 is "mm".

(7) Gas

Using a pellet prepared in each of the examples and comparative examples, a test piece of 80 mm×80 mm×2 mm was injection molded under conditions of a cylinder temperature of 320° C., a mold temperature of 140° C., and a holding pressure of 70 MPa. Then, the formed test piece was finely crushed to about 1 to 2 mm square, and a fogging test was performed. Specifically, 20 g of the crushed pieces were pretreatment-dried at 140° C. for 3 hours, put in a test tube, has a petri dish placed over the mouth of the test tube, and heated at 180° C. for 8 hours in a block bath. After cooling, the fogginess of the petri dish was visually observed. A case of no fogginess was evaluated as A, a case of slight fogginess was evaluated as B, and a case of clearly visible fogginess was evaluated as C. The evaluation results are shown in table 1.

TABLE 1

|  |  | Examples | | | | Comparative examples | | | |
|---|---|---|---|---|---|---|---|---|---|
|  |  | 1 | 2 | 3 | 4 | 1 | 2 | 3 | 4 |
| PAS resin | PPS1 (MV = 50 Pa · s) | 100 | 100 | — | — | — | 100 | — | — |
|  | PPS2 (MV = 30 Pa · s) | — | — | 100 | 100 | 100 | — | 100 | — |
|  | PPS3 (MV = 80 Pa · s) | — | — | — | — | — | — | — | 100 |
| Fibrous inorganic filler | Glass fiber | 99.1 | 50.9 | 81.6 | 102.8 | 101.8 | 36.6 | 60.1 | 102.8 |
| Non-fibrous inorganic filler | Calcium carbonate | 99.1 | — | 35.0 | 51.4 | — | 36.6 | — | 51.4 |
|  | Glass beads | — | 101.8 | — | — | 11.5 | — | — | — |
|  | Glass flakes | — | — | — | — | — | — | 60.1 | — |
|  | Talc | — | — | — | — | 10.2 | — | — | — |
| Fibrous inorganic filler + non-fibrous inorganic filler | | 198.2 | 152.7 | 116.6 | 154.2 | 123.4 | 73.3 | 120.2 | 154.2 |
| Fibrous inorganic filler/non-fibrous inorganic filler | | 1.0 | 0.5 | 2.3 | 2.0 | 4.7 | 1.0 | 1.0 | 2.0 |
| Elastomer | EGMA | 0 | 0 | 14.0 | 0 | 0 | 0 | 25.2 | 0 |
|  | Elastomer (Mass % conversion) | 0 | 0 | 6.1 | 0 | 0 | 0 | 13.6 | 0 |
|  | Alkoxysilane compound | 0 | 0 | 0 | 0.5 | 0 | 0 | 0 | 0.5 |
| Shrinkage rate | Flow direction (X) | 0.26 | 0.24 | 0.14 | 0.15 | 0.22 | 0.28 | 0.13 | 0.20 |
|  | Direction perpendicular to flow direction (Y) | 0.63 | 0.59 | 0.60 | 0.60 | 0.75 | 0.79 | 0.39 | 0.74 |
|  | Y − X | 0.37 | 0.35 | 0.46 | 0.45 | 0.53 | 0.51 | 0.26 | 0.54 |
| Water absorption rate | | A | A | B | A | A | A | C | A |
| Melt viscosity | | 343 | 232 | 251 | 304 | 180 | 311 | 283 | 412 |
| Linear expansion coefficient($\times 10^{-6} K^{-1}$) | | A | A | B | A | B | B | B | A |
| Creep deformation | | A | A | B | B | B | A | B | A |
| Press fitting properties | | B | A | A | B | C | A | A | A |
| Gas | | A | A | B | A | A | A | C | A |

According to table 1, it is seen that good results were obtained in all evaluation results in examples 1 to 4. In contrast, good results were not simultaneously obtained in all evaluation results in comparative examples 1 to 4.

The invention claimed is:

1. A casing member for an in-vehicle camera, obtained by injection molding a resin composition that comprises 100 to 300 parts by mass of a total of a fibrous inorganic filler and a non-fibrous inorganic filler to 100 parts by mass of a polyarylene sulfide resin and has a content of an elastomer of 10% by mass or less, and satisfying following conditions (A) and (B):
   (A) when a molded product of 80 mm×80 mm×1 mm is injection molded using the resin composition under conditions of a cylinder temperature of 320° C., a mold temperature of 140° C., and a holding pressure of 70 MPa, an absolute value of (shrinkage rate in a direction perpendicular to a flow direction)−(shrinkage rate in the flow direction) is 0.5% or less; and
   (B) a water absorption rate of a molded product of 80 mm×80 mm×2 mm that is injection molded using the resin composition under conditions of a cylinder temperature of 320° C., a mold temperature of 140° C., and a holding pressure of 70 MPa is 0.3% or less when subjected to a hot water immersion test at 80° C. for 300 hours.

2. The casing member for the in-vehicle camera according to claim 1, wherein the polyarylene sulfide resin has a melt viscosity of 70 Pa·s or less measured at a temperature of 310° C. and a shear rate of 1200 sec$^{-1}$.

3. The casing member for the in-vehicle camera according to claim 1, wherein a mass ratio of the fibrous inorganic filler to the non-fibrous inorganic filler is 0.2 to 4.5.

4. The casing member for the in-vehicle camera according to claim 1, wherein an average value of a linear expansion coefficient in a flow direction and a linear expansion coefficient in a direction perpendicular to the flow direction at 150° C. is 35 ($\times 10^{-6}$ K$^{-1}$) or less.

5. The casing member for the in-vehicle camera according to claim 1, wherein a creep deformation amount when a stress of 67 MPa is applied for 500 hours at a temperature of 120° C. is 3 mm or less.

6. The casing member for an in-vehicle camera according to claim 1,
   wherein the casing member is used in an in-vehicle camera to be mounted in a front grill of a vehicle or at a position facing a windshield.

7. The casing member for the in-vehicle camera according to claim 1, wherein the casing member is a lens barrel to store and hold a lens in the in-vehicle camera in a press fit state.

8. The casing member for the in-vehicle camera according to claim 1, wherein the casing member is a housing forming an exterior of the in-vehicle camera.

9. A method of manufacturing the casing member for the in-vehicle camera according to claim 1, comprising:
   setting a mass ratio of the fibrous inorganic filler to the non-fibrous inorganic filler to 0.2 to 2.5 in preparation of the resin composition when the casing member for the in-vehicle camera is a lens barrel; and
   setting a mass ratio of the fibrous inorganic filler to the non-fibrous inorganic filler to 0.5 to 3.5 in preparation of the resin composition when the casing member for the in-vehicle camera is a housing.

* * * * *